US011951368B2

(12) United States Patent
Chauvin et al.

(10) Patent No.: US 11,951,368 B2
(45) Date of Patent: Apr. 9, 2024

(54) BALL BAT WITH DECOUPLED BARREL

(71) Applicant: EASTON DIAMOND SPORTS, LLC, Thousand Oaks, CA (US)

(72) Inventors: Dewey Chauvin, Simi Valley, CA (US); Linda Hunt, Simi Valley, CA (US); Ian Montgomery, Simi Valley, CA (US); Frederic St-Laurent, Oak Park, CA (US)

(73) Assignee: EASTON DIAMOND SPORTS, LLC, Thousand Oaks, CA (US)

( * ) Notice: Subject to any disclaimer, the term of this patent is extended or adjusted under 35 U.S.C. 154(b) by 447 days.

(21) Appl. No.: 16/946,865

(22) Filed: Jul. 9, 2020

(65) Prior Publication Data

US 2020/0338417 A1    Oct. 29, 2020

Related U.S. Application Data

(63) Continuation of application No. 15/976,746, filed on May 10, 2018, now Pat. No. 10,709,946.

(51) Int. Cl.
*A63B 60/00* (2015.01)
*A63B 59/51* (2015.01)
(Continued)

(52) U.S. Cl.
CPC ............. *A63B 60/00* (2015.10); *A63B 59/54* (2015.10); *A63B 60/54* (2015.10); *B29C 70/30* (2013.01);
(Continued)

(58) Field of Classification Search
CPC ...... A63B 60/54; A63B 59/54; A63B 2102/18; A63B 2102/182; A63B 2102/20;
(Continued)

(56) References Cited

U.S. PATENT DOCUMENTS 537,927 A    4/1895 Kennedy
546,540 A    9/1895 Kennedy
(Continued)

FOREIGN PATENT DOCUMENTS

JP    H07163693 A    6/1995

OTHER PUBLICATIONS

ASTM International, "F2398-11: Standard Test Method for Measuring Moment of Inertia and Center of Percussion of a Baseball or Softball Bat" USA Baseball ABI Protocol, edition approved Apr. 1, 2011, published May 2011. 3 pages.
(Continued)

*Primary Examiner* — Jeffrey S Vanderveen
(74) *Attorney, Agent, or Firm* — Perkins Coie LLP

(57) ABSTRACT

A ball bat includes outer shell segments longitudinally spaced apart from each other to form a gap between them. A joint connects the segments. A first outer shell segment may include a barrel portion of the ball bat and at least part of a tapered portion of the ball bat. A second outer shell segment may include at least part of the tapered portion. The joint may include a tubular element having a first portion positioned within the first outer shell segment and at least partially overlapping an interior surface of the first outer shell segment, and a second portion positioned within the second outer shell segment and at least partially overlapping an interior surface of the second outer shell segment. The (Continued)

tubular element may include an elastomeric material. In some embodiments, the joint may be formed by an elastomeric material connecting the outer shell segments in the gap.

3 Claims, 5 Drawing Sheets

(51) Int. Cl.
    *A63B 59/54*     (2015.01)
    *A63B 60/54*     (2015.01)
    *A63B 102/18*     (2015.01)
    *A63B 102/20*     (2015.01)
    *B29C 70/30*     (2006.01)
    *B29C 70/86*     (2006.01)
    *B29L 31/52*     (2006.01)

(52) U.S. Cl.
    CPC .............. *B29C 70/86* (2013.01); *A63B 59/51* (2015.10); *A63B 2102/18* (2015.10); *A63B 2102/182* (2015.10); *A63B 2102/20* (2015.10); *A63B 2209/00* (2013.01); *A63B 2209/02* (2013.01); *B29L 2031/5227* (2013.01)

(58) Field of Classification Search
    CPC . A63B 2209/02; A63B 59/51; A63B 60/0081; A63B 2209/00; A63B 60/16; A63B 60/00; B29C 70/30; B29C 70/86; B29L 2031/5227
    See application file for complete search history.

(56) References Cited

U.S. PATENT DOCUMENTS

| | | |
|---|---|---|
| 1,026,990 A | 5/1912 | Matson |
| 1,509,733 A | 9/1924 | Langford et al. |
| 1,650,183 A | 11/1927 | Brooks et al. |
| 2,475,927 A | 7/1949 | Verderber |
| 3,116,926 A | 1/1964 | Owen et al. |
| 3,830,496 A | 8/1974 | Reizer |
| 3,861,682 A | 1/1975 | Fujii |
| 3,876,204 A | 4/1975 | Moore et al. |
| 3,877,698 A | 4/1975 | Volpe |
| 3,897,058 A | 7/1975 | Koch |
| 3,955,816 A | 5/1976 | Bratt |
| 3,963,239 A | 6/1976 | Fujii |
| 4,025,377 A | 5/1977 | Tanikawa |
| 4,032,143 A | 6/1977 | Mueller et al. |
| 4,056,267 A | 11/1977 | Krieger |
| 4,113,248 A | 9/1978 | Yanagioka |
| 4,323,239 A | 4/1982 | Ishii |
| 4,351,786 A | 9/1982 | Mueller |
| 4,399,996 A | 8/1983 | Boyce |
| 4,505,479 A | 3/1985 | Souders |
| 4,569,521 A | 2/1986 | Mueller |
| 4,572,508 A | 2/1986 | You |
| 4,600,193 A | 7/1986 | Merritt |
| 4,746,117 A | 5/1988 | Noble et al. |
| 4,834,370 A | 5/1989 | Noble et al. |
| 4,848,745 A | 7/1989 | Bohannan et al. |
| 4,898,386 A | 2/1990 | Anderson et al. |
| 4,951,948 A | 8/1990 | Peng |
| 4,961,576 A | 10/1990 | Meredith |
| 5,104,123 A | 4/1992 | Okitsu et al. |
| 5,114,144 A | 5/1992 | Baum |
| 5,131,651 A | 7/1992 | You |
| 5,180,163 A | 1/1993 | Lanctot et al. |
| 5,219,164 A | 6/1993 | Peng |
| 5,277,421 A | 1/1994 | Rewolinski |
| 5,303,917 A | 4/1994 | Uke |
| D347,671 S | 6/1994 | Weiss et al. |
| 5,380,003 A | 1/1995 | Lanctot |
| 5,409,214 A | 4/1995 | Cook |
| 5,415,398 A | 5/1995 | Eggiman |
| 5,456,461 A | 10/1995 | Sullivan |
| 5,511,777 A | 4/1996 | McNeely |
| 5,516,097 A | 5/1996 | Huddleston |
| 5,593,158 A | 1/1997 | Filice et al. |
| 5,674,138 A | 10/1997 | Nolan |
| 5,676,609 A | 10/1997 | Mollebaek et al. |
| 5,711,726 A | 1/1998 | Powers et al. |
| 5,722,908 A | 3/1998 | Feeney et al. |
| 5,820,438 A | 10/1998 | Horton |
| 5,833,561 A | 11/1998 | Kennedy et al. |
| 6,048,283 A | 4/2000 | Albarelli et al. |
| 6,050,908 A | 4/2000 | Muhlhausen |
| 6,053,828 A | 4/2000 | Pitsenberger |
| 6,056,655 A | 5/2000 | Feeney et al. |
| 6,099,422 A | 8/2000 | Rappaport |
| 6,173,610 B1 | 1/2001 | Pace et al. |
| 6,280,353 B1 | 8/2001 | Brundage et al. |
| 6,287,222 B1 | 9/2001 | Pitsenberger |
| 6,344,007 B1 | 2/2002 | Feeney et al. |
| 6,398,675 B1 | 6/2002 | Eggiman et al. |
| 6,402,634 B2 | 6/2002 | Lee et al. |
| 6,406,387 B1 | 6/2002 | Ryan et al. |
| 6,432,006 B1 | 8/2002 | Tribble |
| 6,482,114 B1 | 11/2002 | Eggiman et al. |
| 6,485,382 B1 | 11/2002 | Chen |
| 6,497,631 B1 | 12/2002 | Fritzke et al. |
| 6,511,392 B1 | 1/2003 | Chohan |
| 6,547,673 B2 | 4/2003 | Roark |
| 6,569,042 B2 | 5/2003 | LaChance et al. |
| 6,612,945 B1 | 9/2003 | Anderson |
| 6,625,848 B1 | 9/2003 | Schneider |
| 6,663,517 B2 | 12/2003 | Buiatti et al. |
| D485,876 S | 1/2004 | Andrews |
| 6,729,983 B1 | 5/2004 | Vakili et al. |
| 6,733,404 B2 | 5/2004 | Fritzke et al. |
| 6,743,127 B2 | 6/2004 | Eggiman et al. |
| 6,758,771 B2 | 7/2004 | Tribble et al. |
| 6,761,653 B1 | 7/2004 | Higginbotham et al. |
| 6,808,464 B1 | 10/2004 | Nguyen |
| 6,824,482 B1 | 11/2004 | Tribble |
| 6,872,156 B2 | 3/2005 | Ogawa et al. |
| 6,878,080 B2 | 4/2005 | Chang |
| 6,939,237 B1 | 9/2005 | Voden et al. |
| 6,945,886 B2 | 9/2005 | Eggiman et al. |
| 7,011,588 B2 | 3/2006 | Fritzke et al. |
| 7,014,580 B2 | 3/2006 | Forsythe et al. |
| 7,097,578 B2 | 8/2006 | Guenther et al. |
| 7,140,248 B1 | 11/2006 | Brundage |
| 7,140,987 B2 | 11/2006 | Davis et al. |
| 7,140,988 B1 | 11/2006 | Hinman et al. |
| 7,147,580 B2 | 12/2006 | Nutter et al. |
| 7,163,475 B2 | 1/2007 | Giannetti |
| 7,171,697 B2 | 2/2007 | Vito et al. |
| 7,201,679 B2 | 4/2007 | Nguyen et al. |
| 7,235,024 B2 | 6/2007 | Lefebvre et al. |
| 7,297,077 B1 | 11/2007 | Battaglino |
| 7,320,653 B2 | 1/2008 | Fitzgerald et al. |
| 7,344,461 B2 | 3/2008 | Van Nguyen |
| 7,377,866 B2 | 5/2008 | Van Nguyen |
| 7,377,867 B1 | 5/2008 | Vacek et al. |
| 7,381,141 B2 | 6/2008 | Van |
| 7,410,433 B2 | 8/2008 | Guenther et al. |
| 7,419,446 B2 | 9/2008 | Nguyen et al. |
| 7,442,134 B2 | 10/2008 | Giannetti et al. |
| 7,442,135 B2 | 10/2008 | Giannetti et al. |
| 7,534,180 B1 | 5/2009 | Vacek et al. |
| 7,572,197 B2 | 8/2009 | Chauvin et al. |
| 7,585,235 B2 | 9/2009 | Misono et al. |
| 7,704,159 B1 | 4/2010 | McDonald et al. |
| 7,749,115 B1 | 7/2010 | Cruz et al. |
| 7,798,926 B1 | 9/2010 | Hsu et al. |
| 7,837,579 B2 | 11/2010 | Hughes et al. |
| 7,850,553 B2 | 12/2010 | Goldsmith et al. |
| 7,862,456 B2 | 1/2011 | Halko et al. |
| 7,867,114 B2 | 1/2011 | Sutherland et al. |
| 7,909,705 B2 | 3/2011 | Andersen et al. |
| 7,942,764 B2 | 5/2011 | Chung et al. |

(56) References Cited

U.S. PATENT DOCUMENTS

| | | |
|---|---|---|
| 7,955,200 B1 | 6/2011 | Cruz et al. |
| 8,052,547 B2 | 11/2011 | Nusbaum et al. |
| 8,142,382 B2 | 3/2012 | Falone et al. |
| 8,197,365 B2 | 6/2012 | Tokieda |
| 8,206,250 B1 | 6/2012 | Cruz et al. |
| 8,226,505 B2 | 7/2012 | Burger et al. |
| 8,277,343 B2 | 10/2012 | Chang |
| 8,297,601 B2 | 10/2012 | Falone et al. |
| 8,313,397 B2 | 11/2012 | Watari |
| 8,317,640 B1 | 11/2012 | Cruz et al. |
| 8,413,262 B2 | 4/2013 | Falone et al. |
| 8,425,353 B2 | 4/2013 | Jones et al. |
| 8,449,412 B2 | 5/2013 | Vander Pol et al. |
| 8,480,519 B2 | 7/2013 | Chauvin et al. |
| 8,491,423 B1 | 7/2013 | Biggio et al. |
| 8,512,174 B2 | 8/2013 | Epling et al. |
| 8,512,175 B2 | 8/2013 | Epling et al. |
| 8,512,176 B1 | 8/2013 | Mathew et al. |
| 8,545,966 B2 | 10/2013 | Falone et al. |
| 8,694,518 B2 | 4/2014 | Schultz et al. |
| 8,715,118 B2 | 5/2014 | Epling et al. |
| D711,989 S | 8/2014 | Goodwin et al. |
| 8,814,733 B2 | 8/2014 | Tsukamoto |
| 8,827,846 B2 | 9/2014 | Shocklee |
| 8,894,518 B2 | 11/2014 | Chung |
| 8,998,753 B2 | 4/2015 | Tinti |
| 8,998,754 B2 | 4/2015 | Mackey et al. |
| 9,005,056 B2 | 4/2015 | Pegnatori |
| 9,101,810 B2 | 8/2015 | Carlson et al. |
| 9,115,833 B2 | 8/2015 | Crompton et al. |
| 9,149,697 B2 | 10/2015 | Epling et al. |
| 9,242,156 B2 | 1/2016 | Flood et al. |
| 9,265,999 B2 | 2/2016 | Falone et al. |
| 9,308,424 B2 | 4/2016 | Thurman et al. |
| 9,387,382 B2 | 7/2016 | Long |
| 9,457,248 B2 | 10/2016 | Long et al. |
| 9,486,680 B2 | 11/2016 | Burger et al. |
| 9,511,267 B2 | 12/2016 | Thurman et al. |
| 9,669,277 B1 | 6/2017 | Haas et al. |
| 10,245,488 B1 | 4/2019 | Kays |
| 2003/0148836 A1 | 8/2003 | Falone et al. |
| 2004/0048701 A1 | 3/2004 | Falone |
| 2004/0053716 A1 | 3/2004 | Wu et al. |
| 2005/0070384 A1 | 3/2005 | Fitzgerald et al. |
| 2006/0025251 A1 | 2/2006 | Giannetti |
| 2006/0252586 A1* | 11/2006 | Nguyen .............. A63B 59/50 473/564 |
| 2006/0293129 A1 | 12/2006 | Kobayashi et al. |
| 2007/0155546 A1 | 7/2007 | Chauvin |
| 2007/0219027 A1 | 9/2007 | Chong et al. |
| 2008/0070726 A1 | 3/2008 | Watari et al. |
| 2009/0029810 A1 | 1/2009 | Fitzgerald et al. |
| 2009/0215560 A1 | 8/2009 | McNamee et al. |
| 2009/0280934 A1 | 11/2009 | Watari |
| 2009/0280935 A1 | 11/2009 | Watari et al. |
| 2010/0113194 A1 | 5/2010 | Tokieda |
| 2011/0098141 A1 | 4/2011 | Burger |
| 2011/0195808 A1 | 8/2011 | Chauvin et al. |
| 2012/0108371 A1 | 5/2012 | Epling |
| 2014/0080641 A1 | 3/2014 | Epling et al. |
| 2014/0080642 A1 | 3/2014 | Epling et al. |
| 2014/0272245 A1 | 9/2014 | Livingston-Peters et al. |
| 2015/0040349 A1 | 2/2015 | Malia et al. |
| 2015/0157908 A1 | 6/2015 | Van Nguyen |
| 2017/0340935 A1 | 11/2017 | Gray et al. |
| 2019/0143185 A1 | 5/2019 | Hunt et al. |
| 2019/0290980 A1 | 9/2019 | Douglas et al. |

OTHER PUBLICATIONS

Composites World, "Carbon-Kevlar Hinge, Besting metal hardware in weight, thickness, 3X load capacity and 1 million fatigue cycles with no degradation," available at https://www.compositesworld.com/blog/post/carbon-kevlar-hinge-, Oct. 30, 2017. 5 pages.

European Space Agency "Passive Damped Deployment of Full Composite Structures" available at http://www.esa.int/Our_Activities/Space_Engineering_Technology/Shaping_the_Future/Passive_Damped_Deployment_of_Full_Composite_Structures. Exact publication date unknown; website visited Feb. 9, 2018. 2 pages.

Grainger, Inc., "1/2"-14 Brass Hydraulic Coupler Body, 1/2" Body Size", available at https://www.grainger.com/product/31A959?cm_mmc=PPC:+Google+PLA&s_kwcid=AL!2966!3!50916770997!!!g!82128241917!&ef_id=Wamb7gAAAHQQ3Qhf:20180104235230:s&kwid=productads-adid%5e50916770997-device%5ec-plaid%5e82128241917-sku%5e31A959-adType%5ePLA. Exact publication date unknown, website visited Jan. 23, 2018. 2 pages.

Russell, Daniel A., "Do Flexible Handles affect the Performance of Baseball or Softball Bats?", Pennsylvania State University, Graduate Program in Acoustics. Exact publication date unknown, last modified Feb. 23, 2007, website visited Jan. 23, 2018. 9 pgs.

Russell, Daniel A., "Explaining the 98-mph BBS standard for ASA softball", Pennsylvania State University, Graduate Program in Acoustics, available at http://www.acs.psu.edu/drussel/bats/bbs-asa.html, Exact publication date unknown, last modified May 12, 2008, website visited Feb. 9, 2018. 6 pgs.

Russell, Daniel A., "Measuring the Vibrational Behavior of a Baseball/Softball Bat", Science & Mathematics Department, Kettering University, Flint, MI, available at http://www.acs.psu.edu/drussell/bats/modal.html, exact publication date unknown, last modified Mar. 17, 2004, website visited Nov. 15, 2017, 3 pgs.

Russell, Daniel A., "Vibrational Modes of a Baseball Bat", Applied Physics, Kettering University, available at http://www.acs.psu.edu/drussell/bats/batvibes.html, exact publication date unknown, website visited Nov. 15, 2017, 4 pgs.

Sharkbite Plumbing Solutions, "Couplings", available at http://www.sharkbite.com/product/couplings/, exact publication date unknown, website visited Jan. 23, 2018.

Tech Briefs "Locking Mechanism for a Flexible Composite Hinge" available at https://www.techbriefs.com/component/content/article/tb/techbriefs/mechanics-and-machinery/26023, Dec. 1, 2016. 7 pages.

USPTO, U.S. Appl. No. 15/815,423 Non-Final Office Action, dated Oct. 16, 2018, 17 pgs.

USPTO, U.S. Appl. No. 15/815,423 Final Office Action, dated Feb. 11, 2019, 9 pgs.

USPTO, U.S. Appl. No. 15/935,896 Non-Final Office Action, dated Feb. 5, 2019, 22 pgs.

USPTO, U.S. Appl. No. 15/935,896 Final Office Action, dated Jun. 26, 2019, 16 pgs.

USPTO, U.S. Appl. No. 15/935,896 Non-Final Office Action, dated Dec. 5, 2019, 19 pgs.

USPTO, U.S. Appl. No. 15/935,896 Final Office Action, dated Apr. 22, 2020, 23 pgs.

USPTO, U.S. Appl. No. 16/503,281, Non-Final Office Action, dated Jul. 6, 2020, 39 pgs.

USPTO, International Search Report and Written Opinion for International Application No. PCT/US2011/024224 by Easton Sports, Inc., dated May 13, 2011. 6 pages.

3M Canada, "Scotch-Weld Epoxy Adhesive DP100", URL: https://www.3mcanada.ca/3M/en_CA/p/d/b40066487/ (Year: 2020).

* cited by examiner

BALL BAT WITH DECOUPLED BARREL

CROSS-REFERENCE TO RELATED APPLICATION

This application is a continuation of U.S. patent application Ser. No. 15/976,746, filed May 10, 2018 and which is incorporated herein by reference in its entirety.

BACKGROUND

Baseball and softball governing bodies have imposed various bat performance limits over the years with the goal of regulating batted ball speeds. Each association generally develops various regulations to achieve a desired level of play. Some of these regulations are specifically aimed at regulating the performance of a bat, such as BBCOR, or "Bat-Ball Coefficient of Restitution."

BBCOR can be perceived as a measure of the "trampoline effect" a bat exhibits during impact with a ball. Higher BBCOR values generally indicate that less energy will be lost during the bat-ball impact, which suggests a higher performance bat. Lower BBCOR values indicate that more energy will be lost during the impact, which suggests a lower performance bat. Some associations or regulatory bodies dictate a maximum allowable BBCOR value. Accordingly, bat designers look for ways to improve bats while meeting performance regulations, such as BBCOR.

In addition, when a ball bat strikes a ball or another object, the impact causes waves of vibration that players sense as shock. Vibration and shock in a ball bat can cause a player discomfort or injury. Accordingly, bat designers look for ways to reduce vibration and shock in a ball bat without overly reducing performance, feel, or the quality of the sound of an impact. For example, players generally do not want a ball bat to feel or sound like a "wet newspaper" during a hit.

SUMMARY

Representative embodiments of the present technology include a ball bat having a first outer shell segment, a second outer shell segment longitudinally spaced from the first outer shell segment to form a gap between the first outer shell segment and the second outer shell segment, and a joint connecting the first outer shell segment to the second outer shell segment. The first outer shell segment may include a barrel portion of the ball bat and at least part of a tapered portion of the ball bat. The second outer shell segment may include at least part of the tapered portion. The joint may include a tubular element having a first portion positioned within the first outer shell segment and at least partially overlapping an interior surface of the first outer shell segment, and a second portion positioned within the second outer shell segment and at least partially overlapping an interior surface of the second outer shell segment. The tubular element may include an elastomeric material. In some embodiments, the ball bat may further include a second tubular element positioned within the first tubular element to reinforce the first tubular element.

Another representative embodiment of the present technology may include a ball bat with a first outer shell segment, the first outer shell segment forming a barrel portion of the ball bat, and a second outer shell segment, the second outer shell segment forming at least part of a tapered portion of the ball bat, the second outer shell segment being longitudinally spaced from the first outer shell segment by a gap. The ball bat may include an elastomeric material positioned between the first outer shell segment and the second outer shell segment to join the first outer shell segment to the second outer shell segment, the elastomeric material being configured to flex to facilitate relative movement between the first outer shell segment and the second outer shell segment.

Another representative embodiment of the present technology includes a method of making a ball bat. The method may include forming outer shell segments to be longitudinally spaced apart from each other, and forming a joint to connect the outer shell segments. The joint may include an elastomeric material.

Ball bats according to embodiments of the present technology provide sufficient performance to meet association rules without being undesirably underperforming. Embodiments of the present technology also provide sufficient durability and comfort during swings and hits, as well as a satisfying impact sound.

Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the views.

DETAILED DESCRIPTION

The present technology is directed to ball bats with decoupled barrels, and associated systems and methods. Various embodiments of the technology will now be described. The following description provides specific details for a thorough understanding and enabling description of these embodiments. One skilled in the art will understand, however, that the invention may be practiced without many of these details. Additionally, some well-known structures or functions, such as those common to ball bats and composite materials may not be shown or described in detail so as to avoid unnecessarily obscuring the relevant description of the various embodiments. Accordingly, embodiments of the present technology may include additional elements or exclude some of the elements described below with reference to FIGS. 1-5, which illustrate examples of the technology.

The terminology used in this description is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all the items in the list, or (c) any combination of items in the list. Further, unless otherwise specified, terms such as "attached" or "connected" are intended to include integral connections, as well as connections between physically separate components.

Specific details of several embodiments of the present technology are described herein with reference to ball bats. Embodiments of the present technology can be used in baseball, softball, cricket, or similar sports.

Figure 1:
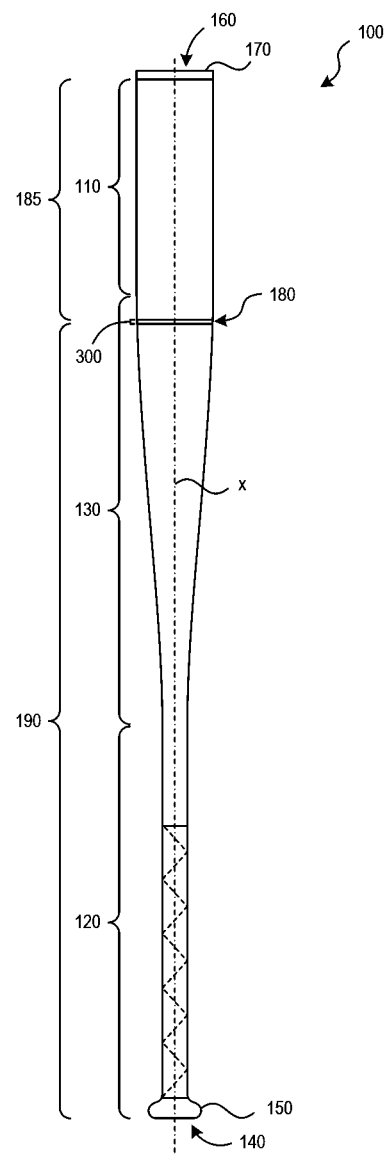
FIG. 1 illustrates a ball bat according to an embodiment of the present technology.

As shown in FIG. 1, a ball bat 100 according to an embodiment of the present technology may have a barrel portion 110, a handle portion 120, and a tapered portion 130 joining the barrel portion 110 to the handle portion 120. The tapered portion 130 tapers to transition the larger diameter of the barrel portion 110 to the narrower diameter of the handle portion 120. The proximal free end 140 of the handle portion 120 may include an end knob 150. The barrel portion 110 may optionally be closed at its distal free end 160 (the end farthest from a player during the swing) with an end cap 170. The ball bat 100 includes a longitudinal axis x spanning between the proximal free end 140 (near a batter) and the distal free end 160 (farthest from a batter).

The proportions of the ball bat 100, such as the relative sizes of the barrel portion 110, the handle portion 120, and the tapered portion 130, are not drawn to scale and may have any relative proportions suitable for use in a ball bat. Accordingly, the ball bat 100 may have any suitable dimensions. For example, the bat 100 may have an overall length of 20 to 40 inches, or 26 to 34 inches. The overall barrel diameter may be 2.0 to 3.0 inches, or 2.25 to 2.75 inches. Typical ball bats have diameters of 2.25, 2.625, or 2.75 inches. Bats having various combinations of these overall lengths and barrel diameters, or any other suitable dimensions, are contemplated herein. The specific preferred combination of bat dimensions is generally dictated by the user of the ball bat 100, and may vary greatly among users.

Also shown in FIG. 1 is a joint 180 according to an embodiment of the present technology. The joint 180 may be positioned at any suitable location along the longitudinal axis x in the tapered portion 130 or the barrel portion 110. In a representative embodiment, the joint 180 is positioned approximately near where the tapered portion 130 meets the barrel portion 110, such as where the tapering of the tapered portion 130 is minimal and corresponds to the cylindrical shape of the barrel portion 110.

The ball bat 100 may be substantially hollow. In some embodiments, it may only be partially hollow. As described in detail below, the joint 180 connects a first outer shell segment 185 (which may span all or part of the barrel portion 110) to a second outer shell segment 190 (which may span all or part of the tapered portion 130 and the handle portion 120). Because the joint 180 may be positioned in various suitable locations, the first outer shell segment 185 and the second outer shell segment 190 may include various combinations of portions of the tapered portion 130 and the barrel portion 110. The joint 180 provides a decoupled configuration in which the first outer shell segment 185 is not contiguous with the second outer shell segment 190. As described in further detail below, such a configuration allows the shell segments 185, 190 to flex or move relative to each other, which may reduce performance (BBCOR, for example, to maintain compliance with association limits) or reduce the shock or vibration felt by a player in the handle portion 120.

In a particular example, the joint 180 may decouple the some or all of the bat's hitting surface (which may include the barrel portion 110 and distal areas of the tapered portion 130) from the handle portion 120. The joint 180 decouples the ball impact from the remainder of (or majority of) the mass of the ball bat 100 (such as most of the handle portion 120 and tapered portion 130). Accordingly, only a portion of the bat's overall mass is effective in propelling the ball, resulting in reduced performance.

In some embodiments, the outer shell segments 185, 190 may be formed with one or more layers of composite materials, such as composite laminate materials. Some examples of suitable composite materials include plies reinforced with fibers of carbon, glass, graphite, boron, aramid (such as Kevlar®), ceramic, or silica (such as Astroquartz®). Accordingly, in various embodiments, a number of different composite plies suitable for use in ball bats may be used in one or both of the outer shell segments 185, 190, including, for example, composites formed from carbon fiber, fiberglass, aramid fibers, or other composite materials or combinations of matrices, resins, fibers, laminates, and meshes forming composite materials.

In some embodiments, one or both of the outer shell segments 185, 190 may include layers or plies made of the same material (for example, each ply or layer may be formed from carbon fiber), while in further embodiments, one or both of the outer shell segments 185, 190 may include layers or plies made of multiple different materials (for example, one or more plies or layers may be formed with carbon fiber, and one or more other plies or layers may be formed with fiberglass). In some embodiments, the outer shell segments 185, 190 may be formed with metal or metal alloys, such as aluminum, steel, titanium, magnesium, or another suitable metal or metal alloy. In some embodiments, the first outer shell segment 185 is made of the same material as the second outer shell segment 190. In some embodiments, the outer shell segments 185, 190 are made of different materials.

Figure 2:
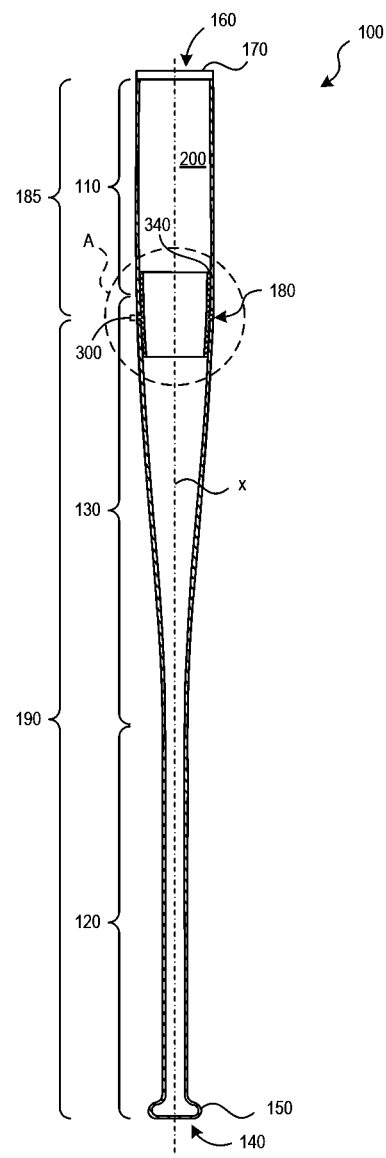
FIG. 2 illustrates a cross-sectional view of the ball bat shown in FIG. 1.

FIG. 2 illustrates a cross-sectional view of the ball bat 100 shown in FIG. 1. The joint 180 includes one or more components positioned inside a hollow interior 200 of the ball bat 100. The one or more components of the joint 180 may overlap the first and second outer shell segments 185, 190. A detailed view of Section A of FIG. 2, which is a representative section of a ball bat 100 having a joint 180 according to an embodiment of the present technology, is illustrated in FIG. 3.

Figure 3:
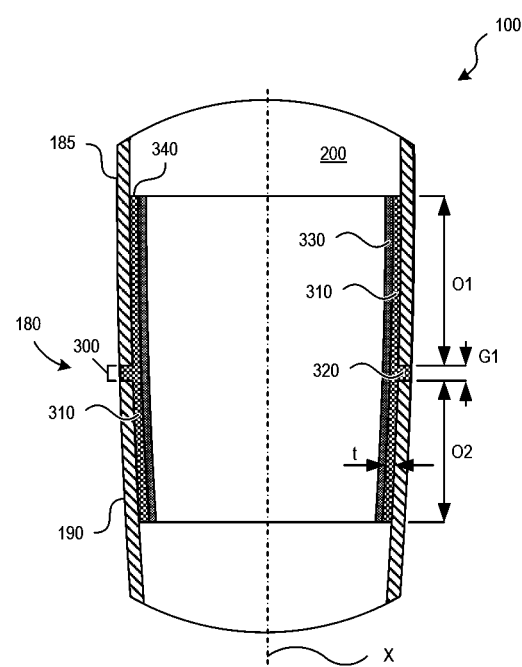
FIG. 3 illustrates a detailed cross-sectional view of a portion of the ball bat shown in FIGS. 1 and 2.

As shown in FIG. 3, the first outer shell segment 185 and the second outer shell segment 190 are longitudinally spaced apart by a gap 300. The gap 300 is preferably fully circumferential about the ball bat 100 such that the outer shell segments 185, 190 do not directly contact each other. In some embodiments, however, the gap 300 may be discontinuous whereby the outer shell segments 185, 190 may be connected to each other or in contact with each other in one or more positions around the circumference of the ball bat 100.

The joint 180 may include a main tubular element 310 positioned inside the hollow interior 200 of the ball bat 100. The main tubular element 310 overlaps or coextends with an interior surface of the first outer shell segment 185 along a distance O1 from a distal end of the gap 300, and overlaps or coextends with an interior surface of the second outer shell segment 190 by a distance O2 from the proximal end of the gap 300. The main tubular element 310 may be attached to each of the outer shell segments 185, 190 by being glued, pinned, or otherwise suitably secured to the segments 185, 190 along all or part of each overlap distance O1, O2. In some embodiments, the main tubular element 310 is laid up with the outer shell segments 185, 190 during manufacturing and cured to be integral with one or both of the outer shell segments 185, 190. In some embodiments, the main tubular element 310 is injected into the gap 300 between the outer shell segments 185, 190 and an optional reinforcing tubular element 330 (described below).

In some embodiments, the main tubular element 310 may have a uniform wall thickness t, and it may coextend circumferentially with the radially interior sides of the outer shell segments 185, 190. In some embodiments, it may be discontinuous, have non-uniform wall thickness, holes in the wall, or other features. Accordingly, the main tubular element 310 is not limited to being a uniform tube.

The main tubular element 310 may have a circumferential or at least partially circumferential protrusion 320 extending at least partially into the gap 300. For example, the protrusion 320 may be in the form of a ring filling the gap 300 to form a smooth surface transition between the outer shell segments 185, 190. In some embodiments, the protrusion 320 may only extend partially into the gap 300. In some embodiments, the protrusion 320 may be integral with the main tubular element 310, while in other embodiments, it may be a discrete element secured to the main tubular element 310 with adhesive or another suitable attachment means.

The main tubular element 310 may include an elastomer or elastomeric material, such as polyurethane, thermoplastic polyurethane, elastomeric epoxy, elastomeric acrylic, cyanoacrylate, silicone, or ethylene-vinyl acetate (EVA) foam, or another suitable material with resilience and strength. In other embodiments, other elastomers or elastomeric materials suitable for providing at least some structural support between the outer shell segments 185, 190, and at least some resilience, may be used.

In some embodiments, the elastomer or elastomeric material in the main tubular element 310 may include or be augmented with various materials to form an elastomeric composite or elastomeric composite ply. For example, the main tubular element 310 may include fibers, weaves, or meshes made of carbon, glass, polyester, graphite, boron, aramid (such as Kevlar®), ceramic, or silica (such as Astroquartz®). In some embodiments, an elastomeric composite may be formed with an elastomeric material as the composite matrix material for the reinforcing fibers, instead of a stiff epoxy or stiff resin material.

In some embodiments, the material forming the main tubular element 310 may have a hardness value between Shore 20A and Shore 90A. The hardness value may depend on the level of desired performance, weight, the size of the main tubular element, the strength and surface area of bonds between components, the strength of the elastomeric material (such as tensile, compressive, and tear strength), or other factors. In some embodiments, a stiffer or harder material may be used when the main tubular element is thinner and has less overlap with the outer shell segments. In some embodiments, a similar apparent stiffness feel may be achieved when the main tubular element includes a softer and thicker material with more overlap with the outer shell segments. In an exemplary embodiment, a semi-rigid thermoplastic material having hardness of approximately Shore 90D may be used.

In some embodiments in which materials with lower hardness values are used, the tear strength of the material may be relatively low compared to materials with higher hardness values, so, in some embodiments, reinforcing layers may be included in the main tubular element 310, such as a layer of flexible knit, fabric, or thread, to increase durability. For example, in a particular embodiment, an open polyester knit may be co-molded between sheets or layers of polyurethane (such as thermoplastic polyurethane, or TPU) to form a tear-resistant tubular element 310. Elastomeric composites may also increase tear resistance.

The protrusion 320 may be formed from the same material as the main tubular element 310, or it may include one or more other materials, including any materials contemplated for the main tubular element 310.

The joint 180 provides a decoupling between the first outer shell segment 185 and the second outer shell segment 190 while providing a sufficient connection to keep the segments 185, 190 from separating during a swing or hit. The main tubular element 310 allows the outer shell segments 185, 190 to flex relative to each other, which reduces performance (e.g., batted ball speed) to comply with regulations. It also reduces transfer of shock or vibration. For example, when a ball impacts the first outer shell segment 185, the vibration or shock may be at least partially absorbed by the joint 180, including the main tubular element 310.

Some embodiments of the present technology may include additional hollow tubular elements. For example, as illustrated in FIG. 3, a reinforcing tubular element 330 may optionally be positioned in a radially inward position inside the main tubular element 310. In some embodiments, the reinforcing tubular element 330 may fully coextend with the main tubular element 310 along the longitudinal axis x. In other embodiments, the reinforcing tubular element 330 may coextend only with a portion of the main tubular element 310 (for example, a portion adjacent to the gap 300). The reinforcing tubular element 330 may be formed from any suitable material, including an elastomer or elastomeric material (such as one of the elastomeric materials or elastomeric composite materials described above), a metal material (such as aluminum, titanium, or another metal or metal alloy), a polymer material, or a rigid or semi-rigid composite material (such as carbon fiber composite materials or other composite materials described above). In a particular embodiment, the reinforcing tubular element 330 is more rigid than the main tubular element 310, and it may be formed with the same or a similar material as one or both of the outer shell segments 185, 190.

In some embodiments, additional tubular elements formed with materials similar to the main tubular element 310 or the reinforcing tubular element 330 may be included in the joint 180. The reinforcing tubular elements (such as the reinforcing tubular element 330 shown in FIG. 3) provide structural rigidity to further tune the relative flex between the outer shell segments 185, 190, for example, by reducing the relative flex. Additional tubular elements, such as the reinforcing tubular element 330, may be glued, pinned, or otherwise fastened to the interior of the main tubular element 310, or they may be included in a composite layup during a composite molding process.

The hardness and thickness of the material used for the main tubular element 310 and the optional reinforcing tubular elements (such as reinforcing tubular element 330 or further inwardly concentric tubular elements) may affect the flexibility of the joint 180 and the performance of the ball bat 100. Designs with softer or thinner elastomers will flex more, reducing bat performance, while designs with harder or thicker elastomers will flex less, resulting in relatively higher performance. In some embodiments, the thickness t of the main tubular element 310 may be between 0.010 inches and 0.50 inches. In a particular embodiment, the main tubular element 310 may have a thickness t between 0.030 inches and 0.250 inches.

The overlap O1 between the main tubular element 310 and the first outer shell segment 185, and the overlap O2 between the main tubular element 310 and the second outer shell segment 190, also affect the flexibility of the joint 180 and, consequently, the performance of the ball bat 100. Longer overlaps may provide additional bending and axial tensile or compressive strength for the overall bat assembly. Longer overlaps may reduce the amount of flex between the outer shell segments 185, 190, which may tend to increase performance. Shorter overlaps O1, O2 may cause more flex in the joint 180, reducing performance. The overlap lengths O1, O2 may also affect durability. For example, shorter overlaps O1, O2 may reduce the durability of the joint 180 relative to longer overlaps.

In some embodiments, one or both of the overlap lengths O1, O2 may be between 0.040 inches and 4.0 inches. For example, in a particular embodiment, each overlap O1, O2 may be at least 0.125 inches. In another particular embodiment, each overlap O1, O2 may be approximately one inch.

In addition, the width G1 of the gap 300 along the longitudinal axis x will affect the relative flex between the outer shell segments 185, 190. For example, a larger gap width G1 may result in more flex than a smaller gap width G1, which translates to decreased performance and shock experienced by a user. In some embodiments, the gap width G1 may be between 0.040 inches and 0.375 inches along the longitudinal axis x, or the gap width G1 may have other values.

The gap width G1 may vary depending on design goals and material selections. In some embodiments, a longer gap width G1 may be useful when the main tubular element 310 or the circumferential protrusion 320 are made with materials having lower compressive strength. A shorter gap width G1 may be associated with less material to distribute stresses and strains during flexing between the outer shell segments. In some embodiments, a designer may prioritize weight savings over durability and may choose a smaller gap width G1, although material selection and other factors may also affect the relationship between weight and durability.

With reference to FIGS. 1 and 3, the gap 300 may be positioned approximately where the tapered portion 130 meets the barrel portion 110, such as where the tapering of the tapered portion 130 is minimal and generally corresponds to the cylindrical shape of the barrel portion 110. In some embodiments, a distal end 340 of the main tubular element 310 of the joint 180 may be positioned only slightly inside of the barrel portion 110, while in other embodiments it may be positioned just outside of the barrel portion 110 (for example, entirely in the tapered portion 130). In some embodiments, the joint 180 (including the main tubular element 310 and any reinforcing tubular element(s) 330) is positioned away from the primary hitting area of the ball bat (i.e., away from where a ball is intended to impact during a normal swing). In such embodiments, the first outer shell segment 185 may form the structure of the barrel portion 110 that impacts a ball.

In some embodiments, the joint 180 may be centered around the center of percussion (COP) of the ball bat 100, or centered around an area that is within approximately three inches of the COP. The COP may be determined by the ASTM F2398-11 Standard. In some embodiments, the joint 180 may be centered around a "sweet spot" of the ball bat 100, or centered around an area that is within approximately three inches of the sweet spot. The sweet spot is typically located near COP. The sweet spot may be defined as the ball-bat impact location where the transfer of energy from the bat 100 to a ball is generally maximal, while the transfer of energy to a player's hands is generally minimal. Another way to define the location of the sweet spot is between the first node of the first bending mode and the second node of the second bending mode.

Figure 4:
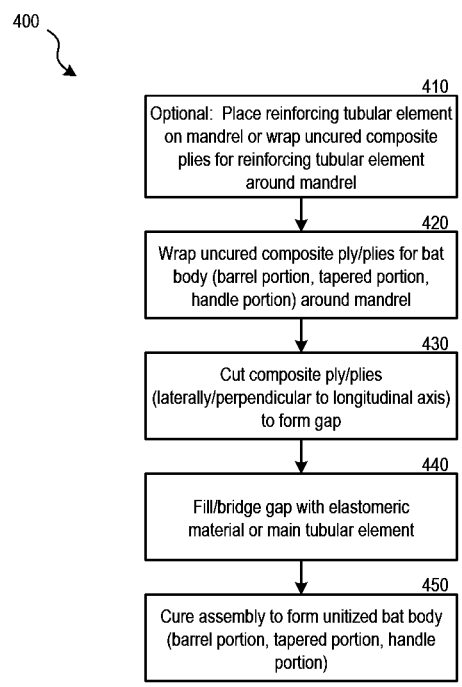
FIG. 4 is a flow chart illustrating an exemplary method of assembling a ball bat according to an embodiment of the present technology.

FIG. 4 is a flow chart 400 illustrating one exemplary method of assembling a ball bat according to an embodiment of the present technology. In step 410, one or more of the optional reinforcing tubular elements (for example, reinforcing tubular element 330 in FIG. 3) may be positioned on a mandrel or otherwise wrapped around the mandrel as one or more uncured composite plies (such as pre-preg material). In step 420, one or more uncured composite plies (such as pre-preg material) may be wrapped around the mandrel to form the bat body (including the barrel portion, the tapered portion, and the handle portion), covering the optional reinforcing tubular element. In step 430, the uncured bat body (excluding the reinforcing tubular element) may be cut circumferentially to form a gap (such as the gap 300 described above and shown in FIG. 3). In step 440, the gap may be filled or bridged with the main tubular element. In step 450, the assembly may be cured to form the ball bat.

In some embodiments, the reinforcing tubular element may be omitted. In some embodiments, instead of cutting in step 430, the composite plies may be wrapped such that the wrapping leaves the gap (300). In some embodiments, a metal bat may be cut and re-connected using the main tubular element and, optionally, the reinforcing tubular element. Various embodiments of the present technology may be assembled in other ways.

Figure 5:
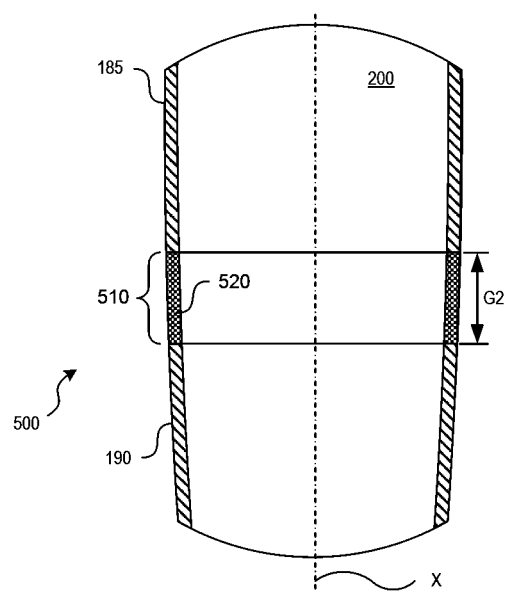
FIG. 5 illustrates a detailed cross-sectional view similar to the view in FIG. 3, but showing a joint according to another embodiment of the present technology.

FIG. 5 illustrates a section of a ball bat having a joint 500 according to another embodiment of the present technology. Like the joint 180 described above, the joint 500 also decouples a hitting portion of the bat from a handle portion. The joint 500 may be positioned in a location similar to the joint 180 described above with regard to FIGS. 1-3. The gap 510 between the outer shell segments 185, 190 may be filled with a material 520, such as an elastomeric material or an elastomeric composite (such as one or more of the elastomeric composite materials described above). Any number of layers of composite material may be used to form the outer shell segments 185, 190, and any number of layers of elastomeric composite material may be used to fill the gap 510. In some embodiments, the width G2 of the gap 510 may be between approximately one inch and two inches, or it may have other dimensions. The elastomeric composite material filling the gap 510 forms a part of the outer shell of a generally hollow bat, such as the bat 100 in FIGS. 1 and 2.

In embodiments like the embodiment illustrated in FIG. 5, the relatively flexible or resilient elastomeric or elastomeric composite material effectively replaces a section of the rigid material used in the remainder of the bat's outer shell (formed by outer shell segments 185, 190). This forms a relatively flexible zone that may reduce performance and vibration or shock similarly to other embodiments described herein. In some embodiments, the joint 500 may be formed by laying up pre-preg composite material to form a bat shape, cutting a section of the bat shape to remove material from the bat shape, replacing the removed material with elastomeric or elastomeric composite material, and curing the assembly. In some embodiments, to make a ball bat, a fiber matrix may be wrapped around a mandrel and coated or saturated with a composite epoxy or resin throughout, with the exception of the gap region 510, which may be coated or saturated with an elastomeric material, such as thermoplastic polyurethane or another suitable elastomeric material. In some embodiments, the material 520 in the gap region 510 may be an elastomeric composite material formed with a fiber material in an elastomeric matrix, and it may make up most or all of the thickness of the overall outer shell of the bat in the gap region 510.

In other embodiments, one or more sections of a wall of a hollow ball bat may include a composite stack made up of layers of flexible and resilient elastomeric composite adjacent to stiffer epoxy or resin-based layers of composite material. For example, the wall of a hollow handle portion, a barrel wall, or a wall in a tapered portion may include a plurality of plies of composite material (such as twelve plies), with several plies in a selected section of the handle portion being elastomeric composite material. In a particular example, all but four of the plies in the section may be an elastomeric composite material, with the remaining plies being a stiffer composite material (such as an epoxy composite material) for structural support. Although one embodiment may involve all but four of the plies being an elastomeric composite material, any suitable number of plies may be an elastomeric composite material.

In a particular embodiment, the outermost (around the outer diameter of the bat) and the innermost (around the inner diameter of the bat) plies may include elastomeric composite plies, while stiffer epoxy composite plies may be sandwiched in between the outermost and innermost groups of elastomeric composite plies. The selected section of the bat with the composite stack having elastomeric composite layers provides a localized flex zone to absorb shock and vibration. In some embodiments, elastomeric resin may be used as the composite matrix instead of epoxy in one or more parts of the bat, resulting in a generally contiguous wall or shell with tailored flexibility characteristics.

In some embodiments, such as in bats required to meet BBCOR limitations, the stiffer epoxy composite layers may be positioned on the outermost layers (around the outer diameter of the bat) and around the innermost layers (around the inner diameter of the bat), while one or more plies of elastomeric composite material may be positioned or sandwiched between the stiffer outermost and innermost epoxy composite layers. Such embodiments may provide a means for complying with the Accelerated Break-In (ABI) portion of the BBCOR standard because if the outermost layer is cracked or broken from rolling or abuse, the bat becomes a soft and slow-reacting bat with reduced performance. Accordingly, the selected section of the bat with the composite stack having elastomeric composite layers or plies may be positioned in any suitable location along the length of the bat.

In other embodiments, one or more layers or plies of elastomeric composite material may be distributed in the composite stack in various manners, such as alternating layers of elastomeric composite and layers of epoxy or resin composite.

The proportion of the elastomeric material relative to the more rigid epoxy or resin material may correlate with the overall flexibility and durability of the ball bat. In some embodiments, up to 75 percent of a composite ply stack forming an outer shell of the ball bat or a barrel wall may include an elastomeric composite material.

In another embodiment, an elastomeric or elastomeric composite material may form one or more layers within a stack of materials forming a composite bat wall along a full length of the hitting surface of a ball bat, while the remainder of the stack of materials may include a stiffer or more rigid composite material with varying thickness along the length of the hitting surface, to tailor the overall flexibility and barrel compression characteristics along the length of the hitting surface. For example, in an exemplary embodiment, the rigid composite material may be thinner near the end cap 170 and tapered portion 130 and thicker toward the middle of the hitting surface. Such an embodiment may comply with BBCOR regulations by providing a more rigid section near the middle of the hitting surface.

From the foregoing, it will be appreciated that specific embodiments of the disclosed technology have been described for purposes of illustration, but that various modifications may be made without deviating from the technology, and elements of certain embodiments may be interchanged with those of other embodiments, and that some embodiments may omit some elements. For example, in some embodiments, the main tubular element (such as the main tubular element 310) may be made with rigid or semi-rigid composite material or metal material.

Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology may encompass other embodiments not expressly shown or described herein, and the invention is not limited except as by the appended claims.

What is claimed is:

1. A ball bat comprising:
an end cap positioned at a distal end of the ball bat;
an end knob positioned at a proximal end of the ball bat, opposite the distal end;
a first outer shell segment comprising at least part of a barrel portion of the ball bat;
a second outer shell segment comprising at least part of a handle portion of the ball bat or at least part of a tapered portion of the ball bat; and
an elastomeric material joining the first outer shell segment to the second outer shell segment;
wherein the ball bat comprises an interior region that extends from the end cap to the end knob and which is entirely hollow between the end cap and the end knob; and
the elastomeric material is contiguous with the first outer shell segment and the second outer shell segment.

2. The ball bat of claim 1 wherein the elastomeric material comprises reinforcing fibers.

3. The ball bat of claim 1 wherein the first outer shell segment or the second outer shell segment comprises a composite laminate material.

* * * * *